(12) United States Patent
Usami

(10) Patent No.: US 7,788,229 B2
(45) Date of Patent: Aug. 31, 2010

(54) STORAGE APPARATUS, DATA RESTORATION METHOD AND COMPUTER SYSTEM

(75) Inventor: Kazuhiro Usami, Odawara (JP)

(73) Assignees: Hitachi, Ltd., Tokyo (JP); Hitachi Computer Peripherals Co., Ltd, Kanagawa-ken (JP)

( * ) Notice: Subject to any disclaimer, the term of this patent is extended or adjusted under 35 U.S.C. 154(b) by 389 days.

(21) Appl. No.: 12/068,290

(22) Filed: Feb. 5, 2008

(65) Prior Publication Data

US 2009/0070385 A1 Mar. 12, 2009

(30) Foreign Application Priority Data

Sep. 11, 2007 (JP) ............................. 2007-235375

(51) Int. Cl.
*G06F 17/30* (2006.01)
(52) U.S. Cl. ...................................... 707/640; 707/661
(58) Field of Classification Search ......... 707/640–655, 707/661, 667–678
See application file for complete search history.

(56) References Cited

U.S. PATENT DOCUMENTS

| | | | |
|---|---|---|---|
| 6,446,175 B1 | 9/2002 | West et al. | |
| 7,200,621 B2 * | 4/2007 | Beck et al. | 707/661 |
| 7,277,905 B2 * | 10/2007 | Randal et al. | 707/648 |
| 7,685,187 B2 * | 3/2010 | Hutchinson et al. | 707/674 |
| 7,694,092 B2 * | 4/2010 | Mizuno | 707/640 |
| 2003/0177306 A1 | 9/2003 | Cochran et al. | |
| 2004/0260873 A1 | 12/2004 | Watanabe | |
| 2005/0278391 A1 | 12/2005 | Spear et al. | |
| 2006/0203857 A1 | 9/2006 | Asako | |
| 2007/0067584 A1 | 3/2007 | Muto | |

FOREIGN PATENT DOCUMENTS

| | | |
|---|---|---|
| JP | 2005-196490 | 1/2004 |
| JP | 2005-339554 | 5/2005 |
| JP | 2007-86972 | 9/2005 |
| JP | 2008-97290 | 10/2006 |

OTHER PUBLICATIONS

Extended European Search Report mailed Aug. 25, 2009.

* cited by examiner

*Primary Examiner*—Wilson Lee
(74) *Attorney, Agent, or Firm*—Stites & Harbison, PLLC; Juan Carlos A. Marquez, Esq

(57) ABSTRACT

An LU management table 61 that associates and stores the LU# of the P-Vol 10*p* and the LU# of the S-Vol 10*s* is provided. The CPU 53 specifies the LU# of the S-Vol 10*s* constituting the save source of the data with respect to the magnetic tape cartridge 74, acquires the LU# of the P-Vol 10*p* associated with the specified LU# from the LU management table 61, reads the saved data from the magnetic tape cartridge 74 storing the data by means of the magnetic tape drive 71, and stores the data read from the magnetic tape cartridge 74 to the P-Vol 10*p* with the acquired LU#. As a result, the data can be restored easily and properly to the P-Vol 10*p*.

10 Claims, 12 Drawing Sheets

NORMAL BACKUP SERVER SYSTEM
100

VDLrestore  [option]  <RESTORE SOURCE TG DESIGNATION>  <RESTORE SET DESIGNATION>

FIG. 3B

VDLrestore    -ps    -tg  0

FIG. 3C

VDLrestore    -ps    -tg  0    -luA 2

FIG. 3D

VDLrestore    -p    -k  DB1_20070720

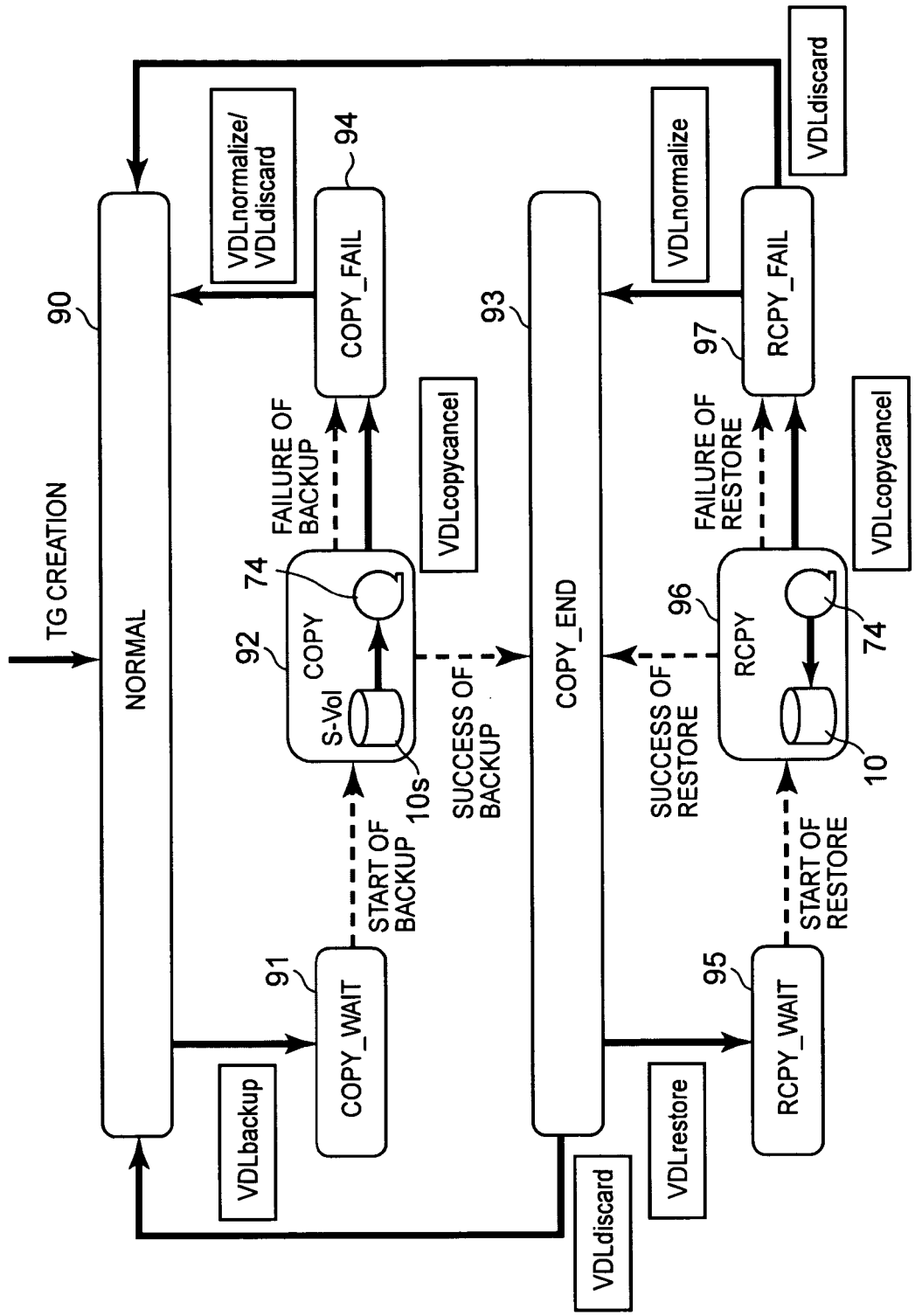

FIG. 8

| LU NUMBER | LU CLOSED STATE | DUPLEXING STATE | P/S STATE | CORRESPONDING LU# |
|---|---|---|---|---|
| 0 | NORMAL | UNDEFINED | UNDEFINED | UNDEFINED |
| 1 | NORMAL | PAIR | P | 2 |
| 2 | NORMAL | PAIR | S | 1 |
| 3 | NORMAL | COPY IN PROGRESS (P→S) | P | 4 |
| 4 | NORMAL | COPY IN PROGRESS (P→S) | S | 3 |
| 5 | NORMAL | SUSPEND | P | 6 |
| 6 | NORMAL | SUSPEND | S | 5 |
| 7 | NORMAL | UNDEFINED | UNDEFINED | UNDEFINED |
| 8 | CLOSED | UNDEFINED | UNDEFINED | UNDEFINED |
| 9 | UNDEFINED | UNDEFINED | UNDEFINED | UNDEFINED |

FIG. 9

| TAPE CARTRIDGE NUMBER | TAPE CARTRIDGE STATE | LIBRARY NUMBER | SLOT POSITION | BARCODE |
|---|---|---|---|---|
| 0 | NORMAL | 0 | 1 | 000000L3 |
| 1 | NORMAL | 0 | 2 | 000001L3 |
| 2 | NORMAL | 1 | 1 | 000002L3 |
| 3 | NORMAL | 1 | 2 | 000003L3 |
| 4 | NORMAL | 0 | 3 | 000004L3 |
| 5 | NORMAL | 0 | 4 | 000005L3 |
| 6 | NORMAL | 1 | 3 | 000006L3 |
| 7 | NORMAL | 1 | 4 | 000007L3 |
| 8 | DETACHED | 1 | 5 | 000008L3 |
| 9 | UNDEFINED | 0 | 5 | 000009L3 |

FIG. 10

| TG NUMBER | TG CLOSED STATE | TG COPY STATE | MIRROR STATE | TAPE CARTRIDGE NUMBER (PRIMARY) | TAPE CARTRIDGE NUMBER (SECONDARY) | STORAGE LU LIST | WRITE DATE AND TIME | KEYWORD |
|---|---|---|---|---|---|---|---|---|
| 0 | NORMAL | COPY_END | ON | 0,1 | 2,3 | 2,4 | 2007/07/20 01:23:45 | DB1_20070720 |
| 1 | SECONDARY CLOSURE | COPY_END | ON | 4,5 | 6,7 | 2,4 | 2007/07/19 01:23:45 | DB1_20070719 |
| 2 | NORMAL | COPY_END | OFF | 9 | | 10,11,12 | 2007/07/20 05:55:55 | DB2_20070720 |
| 3 | NORMAL | COPY_END | OFF | 8 | | 20,21 | 2007/07/20 03:33:33 | DB3_20070720 |

FIG. 11

DATA TRANSFER CONTROL TABLE
65

| | |
|---|---|
| DATA TRANSFER DIRECTION | 65a |
| TG# | 65b |
| PRIMARY LIBRARY# | 65c |
| PRIMARY TAPE DRIVE# | 65d |
| PRIMARY TAPE CARTRIDGE# | 65e |
| SECONDARY LIBRARY# | 65f |
| SECONDARY TAPE DRIVE# | 65g |
| SECONDARY TAPE CARTRIDGE# | 65h |
| TRANSFER LU LIST | 65i |
| TRANSFERRED LU COUNTER | 65j |
| PRIMARY TRANSFER DESTINATION LU LIST | 65k |
| SECONDARY TRANSFER DESTINATION LU LIST | 65l |

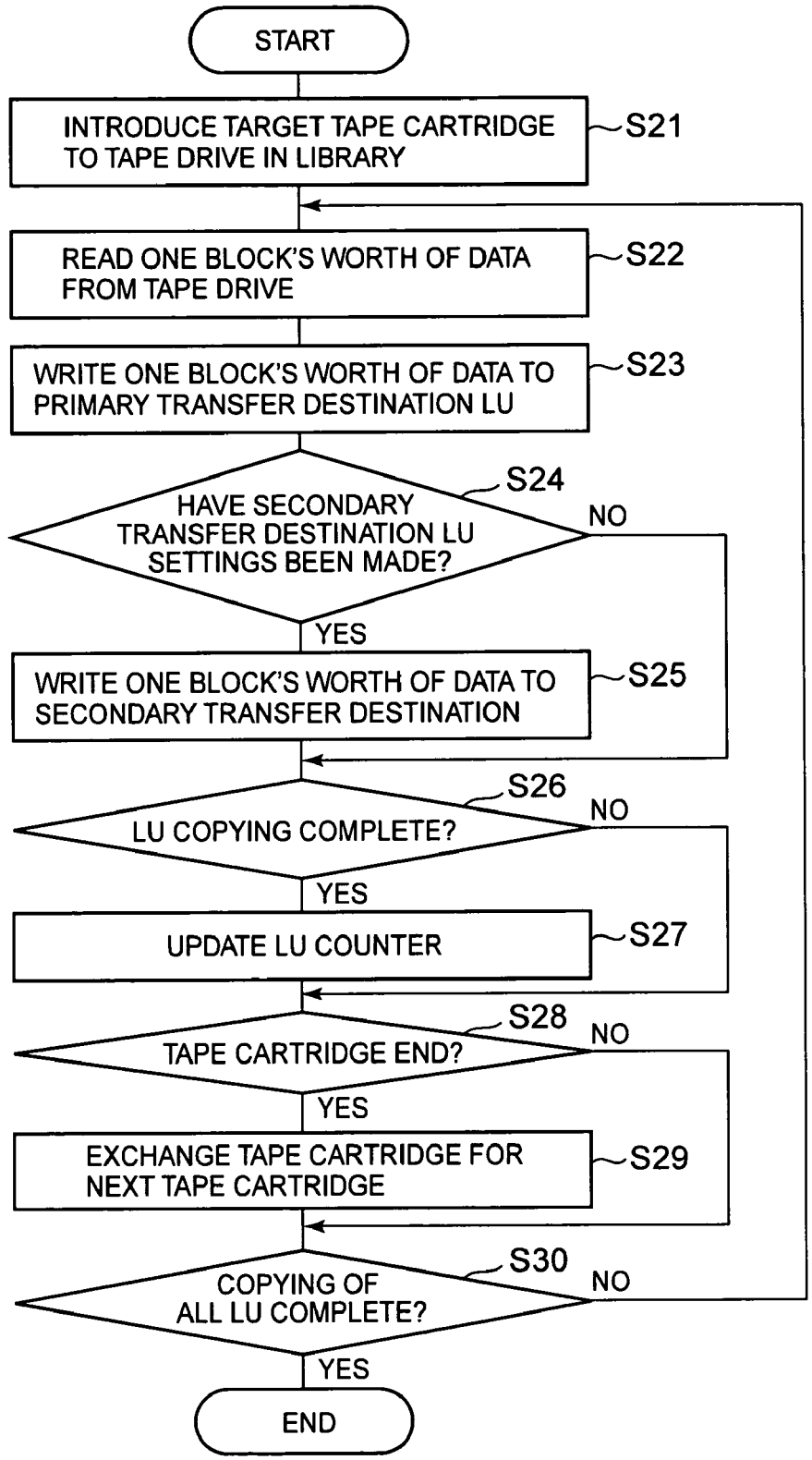

STORAGE APPARATUS, DATA RESTORATION METHOD AND COMPUTER SYSTEM

CROSS-REFERENCE TO PRIOR APPLICATION

This application relates to and claims the benefit of priority from Japanese Patent Application number 2007-235375, filed on Sep. 11, 2007 the entire disclosure of which is incorporated herein by reference.

BACKGROUND

In order to improve the reliability of data storage in a storage system, data are stored after being multiplexed (duplexed, for example) in a plurality of logical volumes and, in cases where a fault or the like occurs with any logical volume, data restoration is performed by utilizing the data of another logical volume.

As technology that utilizes data duplexing, technology that performs high-speed restoration based on a data update history in cases where a fault occurs in one of the duplexed systems has been disclosed (See Japanese Application Laid Open No. 2007-86972, for example). Further, a technology that reduces the processing load of a higher level device when data are duplexed is also known (See Japanese Application Laid Open No. 2005-196490, for example). Further, technology that performs a high-speed restore with respect to storage constituting the source from storage which is the target when data duplexing is performed is also known (Japanese Application Laid Open No. 2005-339554, for example).

In addition, a backup server system that improves the reliability of data storage more reliably and at a lower cost by saving duplexed data to a magnetic tape cartridge is known.

FIG. 1 illustrates a backup server system according to a conventional example.

In a backup server system 100, a task server 101 stores data which are used in the task in a P-Vol (Primary Volume) 105 of a disk array device 102 and, in the disk array device 102, data which are written to the P-Vol 105 are duplexed to an S-Vol (Secondary Volume) 106 with predetermined timing. Thereafter, a backup server 103 backs up the data of the S-Vol 106 to tape cartridge 107 of a tape library device 104. Thereafter, when data restoration is performed, the backup server 103 reads data from the tape cartridge 107 by means of a tape library device 104 and stores this data in the S-Vol 106. As a result, the data of the S-Vol 106 can be restored. Subsequently, by starting a reverse copy from the S-Vol 106 to the P-Vol 105, in the case of a low load task, the task server 101 is able to re-start the task utilizing the P-Vol 105. However, in the case of a high load task, when the host access performance drops as a result of the reverse copy from the S-Vol 106 to the P-Vol 105, the task cannot be re-started until the reverse copy is complete.

According to the technology of the above backup server system, the S-Vol 106 that holds the backup is restored, whereupon the task can be re-started by re-starting the reverse copy to the P-Vol 105.

However, in a task restart immediately after restoring the S-Vol 106, the data have not been completely restored to the P-Vol 105. Hence, in cases where read access to an uncopied region of the P-Vol 105 takes place, a response to the host device can only be made after copying from the S-Vol 106. Further, data required for the parity generation of the RAID configuration must be copied from the S-Vol 106 even when the P-Vol 105 is write-accessed. As a result, the host access performance is reduced still further.

In order to prevent a drop in the host access performance of this kind, a direct restore operation from the tape cartridge to the P-Vol 105 has been considered.

In this case, the user unmounts the P-Vol 105 from the task server 101 and mounts the P-Vol 105 on the backup server 103. The user then designates the tape cartridge 107 for storing the backup data of the S-Vol 106 corresponding with the P-Vol 105 that the user has mounted on the backup server 103, and instructs the P-Vol constituting the restore destination to execute a restore to the P-Vol 105. Thereafter, the user unmounts the P-Vol 105 from the backup server 103 and mounts the P-Vol 105 on the task server 101. As a result, the task can be restarted if the task is a low load task. In such a case, because there is no need to read-access the S-Vol 106 in the case of read access and write access by the task server 101, there is no drop in the host access performance as a result of accessing the S-Vol 106.

Thereafter, by performing a copy from the P-Vol 105 to the S-Vol 106, a task can be performed without hindrance following copy completion even in the case of a high load task. In addition, following restore completion to the P-Vol 105, the high-load task is started immediately, whereupon an operation in which a copy is made from the P-Vol 105 to the S-Vol 106 in a low load time band such as at night or during a holiday is also possible.

However, in cases where a restore to the P-Vol 105 is performed, the user must perform an operation of the kind described earlier, which is time-consuming. Moreover, it is necessary to designate the P-Vol 105 rather than the S-Vol 106 which is the save source of the data as the restore destination for the data from the tape cartridge, and there is a risk of error in this designation. In addition, whereas the user is normally conscious of the logical volume name of the OS file system, in a basic operation, the user must be conscious of the LU of the disk array device. In addition, in the case of a user with no detailed knowledge of the disk array device 102, there is also the problem that it is difficult to find out the P-Vol 105 which corresponds with the S-Vol.

SUMMARY

Therefore, the present invention was conceived in view of the above problem and an object of the present invention is to provide technology that makes it possible to restore the data of a logical volume (P-Vol) which manages the original data easily and reliably.

In order to solve the above problem, the storage apparatus according to a first aspect of the present invention is a storage apparatus having a plurality of storage devices and a magnetic tape drive capable of accessing a magnetic tape cartridge, the storage apparatus managing a plurality of logical volumes to which at least some storage areas of the plurality of storage devices are assigned, the logical volumes including a first logical volume for storing original data which are utilized by a host device and a second logical volume for storing the data of a copy of the original data of the first logical volume, and the storage apparatus saving the data of the second logical volume to the magnetic tape cartridge and restoring the saved data to the logical volumes, comprising: a logical volume management table for associating and storing first identification information which indicates the first logical volume and second identification information which indicates the second logical volume; a data specification information acceptance section that accepts data specification information for specifying the data of a restoration target; a specification section that specifies the second identification information of the second logical volume constituting a save source of the data specified by the data specification information; first identification information acquisition section that acquires the first identification information associated with the specified second identification information from the logical volume management table; a reading control section that reads the saved data from the magnetic tape cartridge storing the data of the restoration target by means of the magnetic tape drive; and a first restoration control section that stores the data read from the magnetic tape cartridge to the first logical volume indicated by the acquired first identification information.

BRIEF DESCRIPTION OF THE DRAWINGS

FIG. 3A shows the constitution of the script of the restore command;

FIG. 3B shows an example of the script of the restore command;

FIG. 3C shows an example of the script of the restore command;

FIG. 3D shows an example of the script of the restore command;

FIG. 7 illustrates the transition of states that correspond with commands of the backup and restore processing according to an embodiment of the present invention;

FIG. 8 shows an example of an LU management table according to an embodiment of the present invention;

FIG. 9 shows an example of a tape management table according to an embodiment of the present invention;

FIG. 10 shows an example of a tape group management table according to an embodiment of the present invention;

FIG. 11 shows an example of a data transfer control table according to an embodiment of the present invention;

FIG. 13 is a flowchart for data transfer processing according to an embodiment of the present invention.

DESCRIPTION OF THE PREFERRED EMBODIMENTS

The embodiments of the present invention will now be described with reference to the drawings. The embodiments described hereinbelow do not limit the inventions of the claims and all the combinations of characteristics described in the embodiments are not always required as means for resolving the invention.

Figure 1:
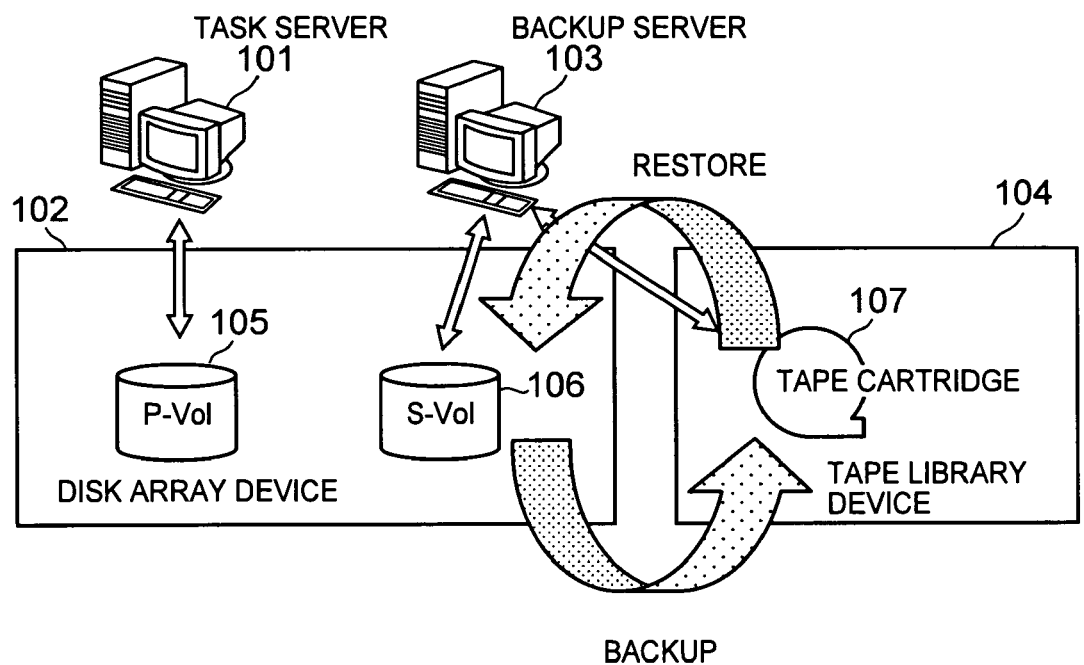
FIG. 1 illustrates a backup server system according to a conventional example.
Figure 2:
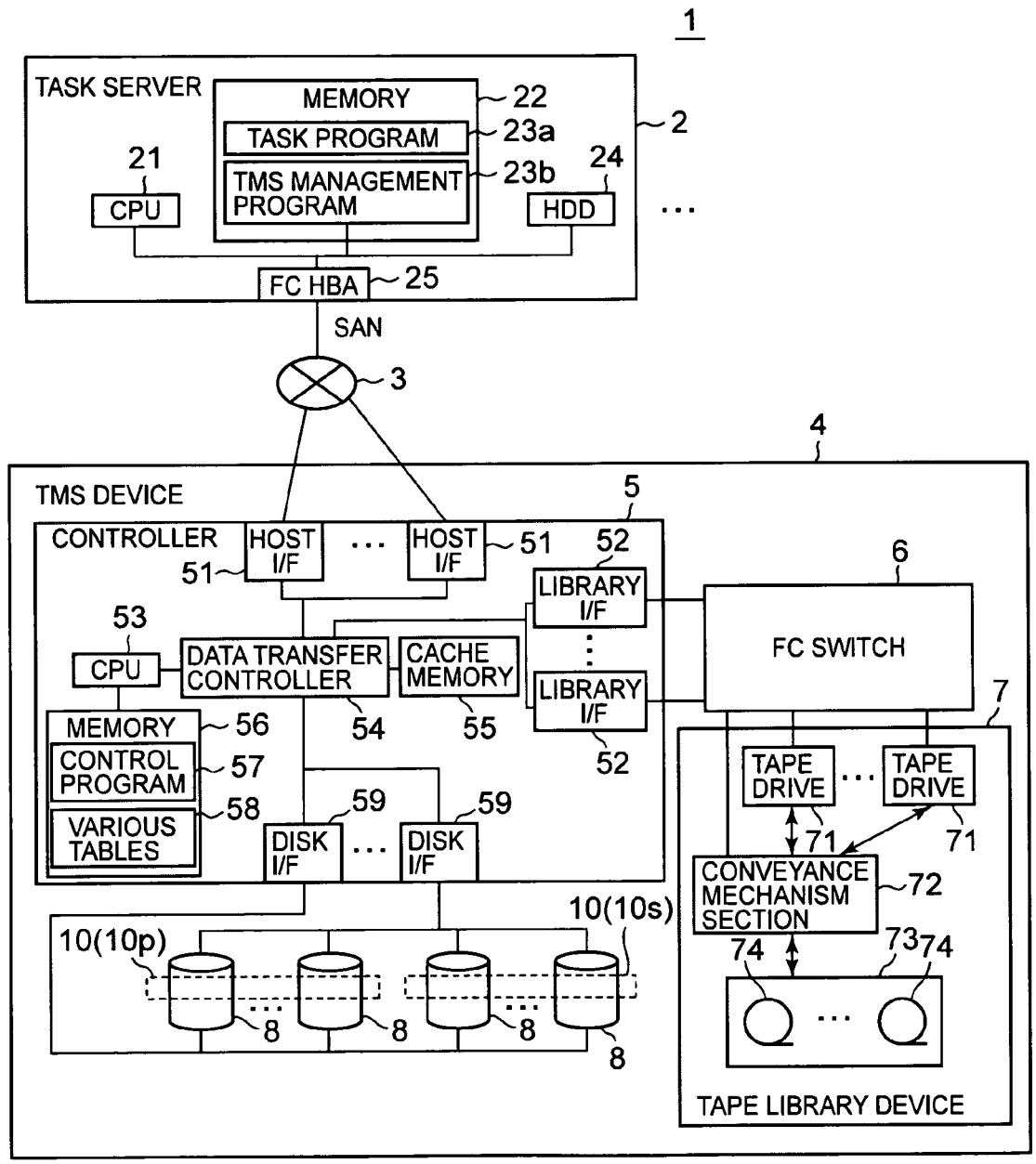
FIG. 2 shows the schematic configuration of a computer system according to an embodiment of the present invention.

FIG. 2 shows the schematic configuration of a computer system according to an embodiment of the present invention.

The computer system 1 comprises a task server 2 which is an example of a host device, a TMS (Tape Attached Modular Storage) device 4 which is an example of the storage apparatus. The task server 2 and TMS device 4 are connected via a data network 3 such as a SAN (Storage Area Network), for example. The communication protocol used for the SAN may be the Fibre Channel protocol or iSCSI protocol, for example. There may also be a plurality of task servers 2.

The task server 2 comprises a CPU (Central Processing Unit) 21 (first processor), a memory 22, a HDD (Hard Disk Drive) 24, and an FCHBA (Fibre Channel Host Bus Adapter) 25 (first interface) The memory 22 stores a task program 23a that handles data write requests and read requests with respect to disk drives 8 of the TMS device 4 and a TMS management program 23b for managing the duplexing processing, backup processing, restore processing and so forth by the TMS device 4.

As a result of being executed by the CPU 21, the TMS management program 23b transmits commands that are inputted by the user by using an input device (not shown) of the task server 2 and commands determined in accordance with preset rules to the TMS device 4 via the FC HBA 25, receives the results of the commands via the FC HBA 25, and displays these results on a display device (not illustrated).

Duplexing processing-related commands include a paircreate command for establishing a PAIR state in which data are synchronized for the logical volume 10 of the TMS device 4 that the task server 2 is to use for the storage of the original data and another logical volume 10, a pairsplit command for establishing a suspend state (PSUS state) in which a logical volume which is in the pair state is temporarily separated from the pair state, and a pairresync command for re-establishing two logical volumes 10 in the suspend state in the pair state, or other commands. Here, a logical volume 10p that the task server 2 is to use in the storage of original data is called the P-vol (primary volume: first logical volume) and a logical volume 10s which is data-synchronized with the P-vol is referred to as the S-Vol (secondary volume: second logical volume).

In addition, commands relating to backup processing and restore processing include a VDLbackup command for saving and storing (backing up) the data of the logical volume 10 to a predetermined magnetic tape cartridge 74, a VDLcopycancel command for halting the backup or restore, a VDLnormalize command for canceling an error state, aVDLdiscard command for discarding the group (tape group (TG): storage unit) of the backed up magnetic tape cartridge 74, a VDLrestore command for carrying out a restore, a VDLdisplay command for searching for the various TG states and displaying same, and a VDLsearch command for searching the TG based on keywords. For example, in the case of the VDLdisplay command, when the user designates the LU# of the logical volume 10 constituting the save source (second identification information), the TG# in which the logical volume was saved by the TMS device 4 is sought and sent back and the result is displayed on the display device (not shown).

FIG. 3A shows the configuration of the script of the restore command and FIGS. 3B to 3D show an example of the script of the restore command.

The script 26 of the VDLrestore command constituting the restore command comprises a command portion 26a which indicates that the command is a VDLrestore command, an option portion 26b which designates the command option; a restore source TG designation portion 26c, and a restore set designation portion 26d. The option portion 26b and the restore set designation portion 26d can be omitted.

The option portion 26b designates a restore that involves the P-Vol as the target or a restore in which the P-Vol and S-Vol are simultaneous targets. In this embodiment, in cases where the restore target is the P-Vol, "-p" is recorded and, in cases where the restore targets are the P-Vol and S-Vol, "-ps" is recorded. When option portion 26b is omitted, the restore target is the S-Vol.

The restore source TG designation portion 26c designates information specifying the TG which is used to perform the restore (an example of data specification information) such as, for example, the keyword associated with the magnetic tape cartridge 74 and the TG# (tape group number: storage unit identification information) to which the magnetic tape cartridge 74 belongs, for example. For example, in cases where a keyword is designated, "-k<XXXXX>" (where "XXXXX" indicates the keyword) is described. Further, in cases where the TG# is designated, "-tg<XXX>" ("XXX" indicates the TG#) is described.

The restore set designation portion 26d designates the LU# in the restore target TG (logical unit number: second identification information) and, in cases where the restore destination is changed, designates the LU# of the restore destination. In cases where the LU# of the restore target is designated, the descriptor is "-luA<XXX . . . >" ("XXX" is the LU#) A plurality of LU# of the restore target can be designated. In addition, in cases where the restore destination LU# is designated, the descriptor is "-luB<XXX . . . >" ("XXX" is the LU#). A plurality of LU# of the restore destination can be designated. In cases where the restore set designation portion 26d is omitted, this means that the data of all the LU in the TG are to be restored.

The script shown in FIG. 3B signifies the fact that all the data stored in the tape group for which the TG# is "0" are restored to the P-Vol and S-Vol.

In addition, the script shown in FIG. 3C signifies the fact that data of LU# "2" in TG# "0" are restored to the P-Vol and S-Vol.

Furthermore, the script shown in FIG. 3D signifies the fact that all the data of the tape group with keyword "DB1_20070720" are restored to the P-Vol.

In this embodiment, the TMS management program 23b converts the designated command script into the record format of the command control table 27 and transmits it to the TMS device 4.

Figure 4:
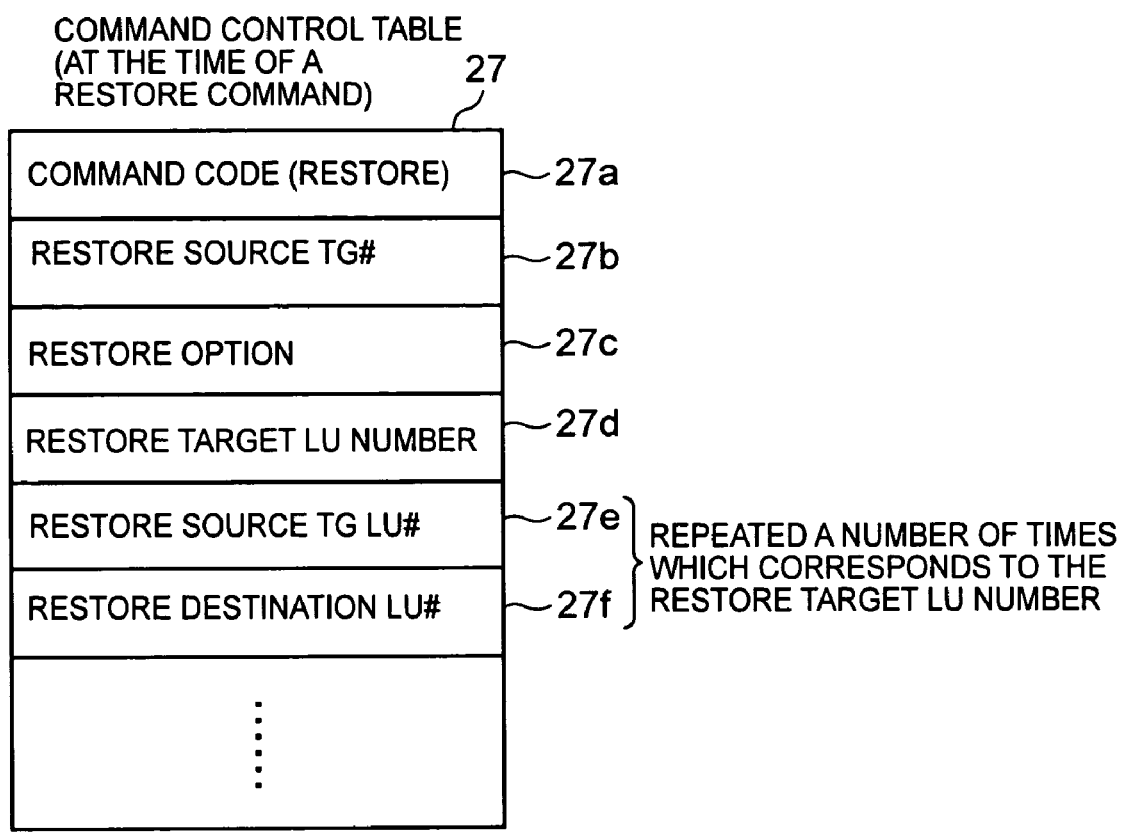
FIG. 4 shows an example of a command control table according to an embodiment of the present invention.

FIG. 4 shows the configuration of the command control table according to an embodiment of the present invention.

The command control table 27 at the time of a restore command (VDLrestore command) holds a record that comprises a command code field 27a, a restore source TG# field 27b, a restore option field 27c, a restore target LU number field 27d, a restore source TG LU# field 27e, and a restore destination LU# field 27f.

The command code field 27a stores the command (a restore command in this example). The restore source TG# field 27b stores the TG# used for the restore (an example of data specification information). If the TG# is directly designated by the command script, the designated TG# is stored and, in cases where a keyword (an example of data specification information) is set, the TG# corresponding with the keyword is sought and stored. The restore option field 27c stores the designation of the command script option portion 26b. In other words, a designation that makes the restore destination the P-Vol or the P-Vol and the S-Vol is stored. The restore target LU number field 27d stores the number of LU constituting the restore target. In this embodiment, the number of LU designated by the restore set designation section 26d of the command script is stored in the restore target LU number field 27d. In cases where all the LU of the TG are restored, that is, in cases where the restore set designation portion 26d of the command script is omitted, no settings are made for the fields 27d, 27e, and 27f. The restore source TG LU# field 27e stores the LU# of the restore target. The restore destination LU# field 26f stores the LU# of the restore destination. The restore source TG LU# field 27e and the restore destination LU# field 26f are set in a quantity that corresponds to the number of restore target LU. In cases where the restore destination LU# has not been designated, no setting is made for the restore destination LU# field 26f.

Returning now to the description of FIG. 2, the TMS device 4 comprises a plurality of disk drives 8 (an example of storage devices), a controller 5, a tape library device 7, and an FC (Fibre Channel) switch 6 that communicably connects the controller 5 and tape library device 7.

The tape library device 7 comprises a plurality of tape drives 71, a conveyance mechanism section 72, and a tape library section 73.

The tape library section 73 is able to house a plurality of magnetic tape cartridges 74. The tape drives 71 are able to execute data reading and data writing with respect to the magnetic tape cartridges 74. In this embodiment, the tape library 71 can be controlled by means of SCSI commands. The conveyance mechanism section 72 removes magnetic tape cartridges 74 from the tape library section 73 and conveys same to the tape drives 71. In this embodiment, the conveyance mechanism section 72 can be controlled by means of SCSI commands.

The TMS device 4 is able to assemble RAID (Redundant Arrays of Inexpensive Disks) configurations by means of a plurality of disk drives 8. In this embodiment, one or a plurality of storage areas, that is, logical volumes (logical units: LU) 10 are provided by a plurality of disk drives 8 or one or a plurality of logical volumes 10 can be provided by means of one disk drive 8. P-Vol 10p or S-Vol 10s can be taken as the respective logical volumes 10, depending on the settings.

The controller 5 is a control module that controls a plurality of disk drives 8 and the tape library device 7 and comprises a plurality of host I/F (second interfaces) 51, a plurality of library I/F 52, a CPU (second processor) 53, a data transfer controller 54, a cache memory 55, a memory 56, and a plurality of disk I/F 59.

The host I/F 51 exchanges data between the controller 5 and the task server 2. The library I/F 52 exchanges data between the controller 5 and the tape library device 7. The CPU 53 executes processing in accordance with programs stored in the memory 56 or the like. The specific processing will be described subsequently in the description of the programs. The data transfer controller 54 controls the transfer of data between the task server 2, the disk drives 8, the tape library device 7, the cache memory 55, and the CPU 53. The cache memory 55 temporarily stores data exchanged between the task server 2 and the disk drives 8 and data exchanged between the tape library device 7 and the disk drives 8, and so forth. The disk I/F 59 exchanges data between the controller 5 and the disk drives 8.

The memory 56 stores a control program 57 and various tables 58.

Figure 5:
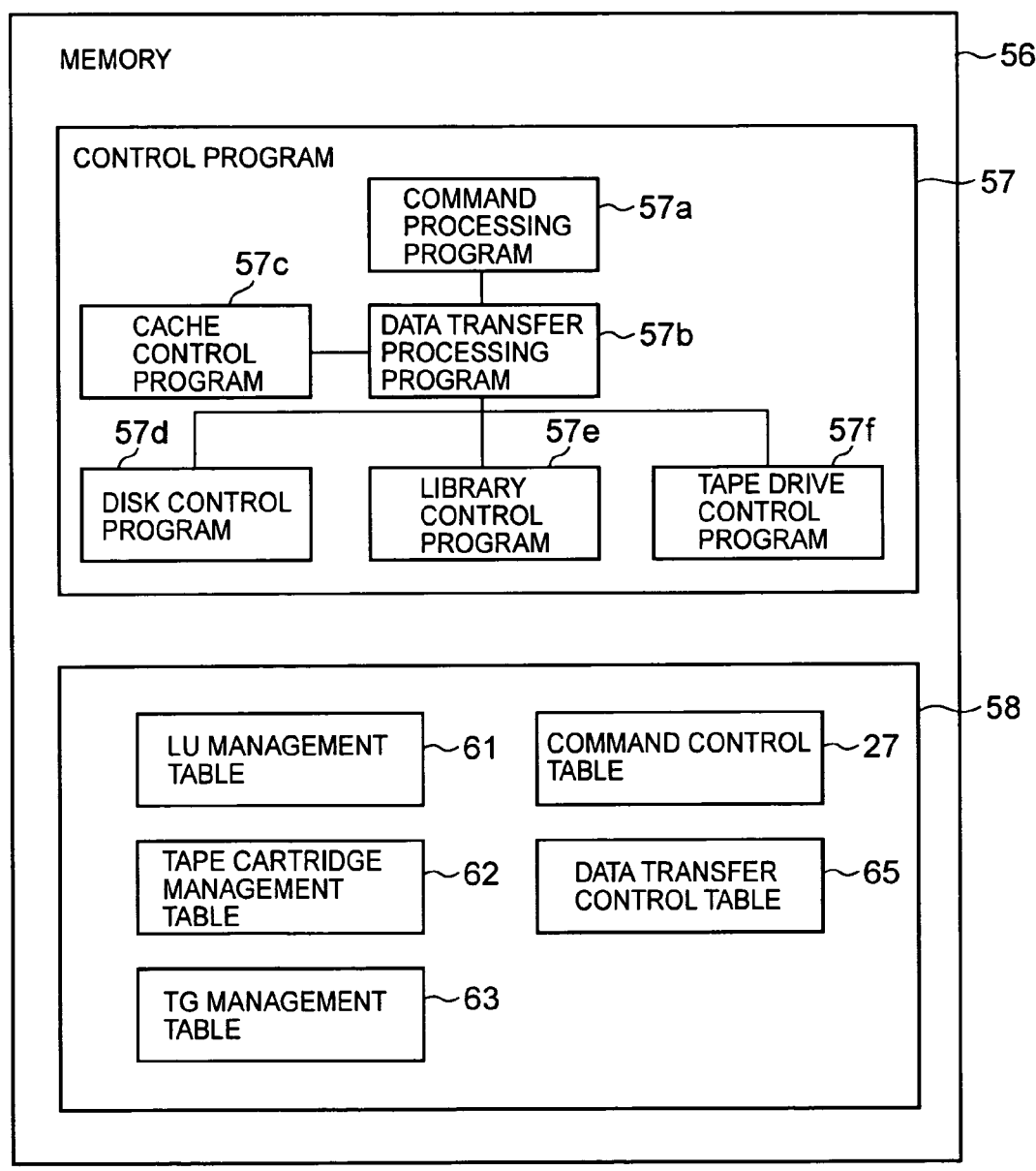
FIG. 5 shows an example of an in-memory program and table configuration according to an embodiment of the present invention.

FIG. 5 shows an example of an in-memory program and table configuration according to an embodiment of the present invention.

The control program 57 comprises a command processing program 57a, a data transfer processing program 57b, a cache control program 57c, a disk control program 57d, a library control program 57e, and a tape drive control program 57f.

The command processing program 57a is a program for allowing the CPU 53 to analyze commands received from the task server 2 and to control the corresponding processing.

The data transfer processing program 57b is a program for allowing the CPU 53 to control data transfers. In this embodiment, the CPU 53 that executes the data transfer processing program 57b calls up and executes the cache control program 57c, the disk control program 57d, the library control program 57e, and the tape drive control program 57f, depending on the circumstances.

The cache control program 57c is a program for allowing the CPU 53 to execute control of reading and temporarily caching write target data in the cache memory 55 and reading and writing the data.

The disk control program 57d is a program for allowing the CPU 53 to execute control of the writing of data to the disk drives 8 and the reading of data from the disk drives 8.

The library control program 57e is a program for allowing the CPU 53 to execute control to convey the magnetic tape cartridges 74 in the tape library section 73 to the tape drives 71 by controlling the conveyance mechanism section 72 and to remove the magnetic tape cartridges 74 from the tape drives 71 and store same in the tape library section 73.

The tape drive control program 57f is a program for allowing the CPU 53 to execute control of the writing of data to the magnetic tape cartridges 74 and the reading of data from the magnetic tape cartridges 74 by controlling the tape drives 71.

Here, the data specification information acceptance section, specification section, first identification information acquisition section, reading control section, first restoration control section, second restoration control section, type designation acceptance section, search condition acceptance section, search section, and search result transmission section are constituted as a result of the control program 57 being executed by the CPU 53.

Figure 6:
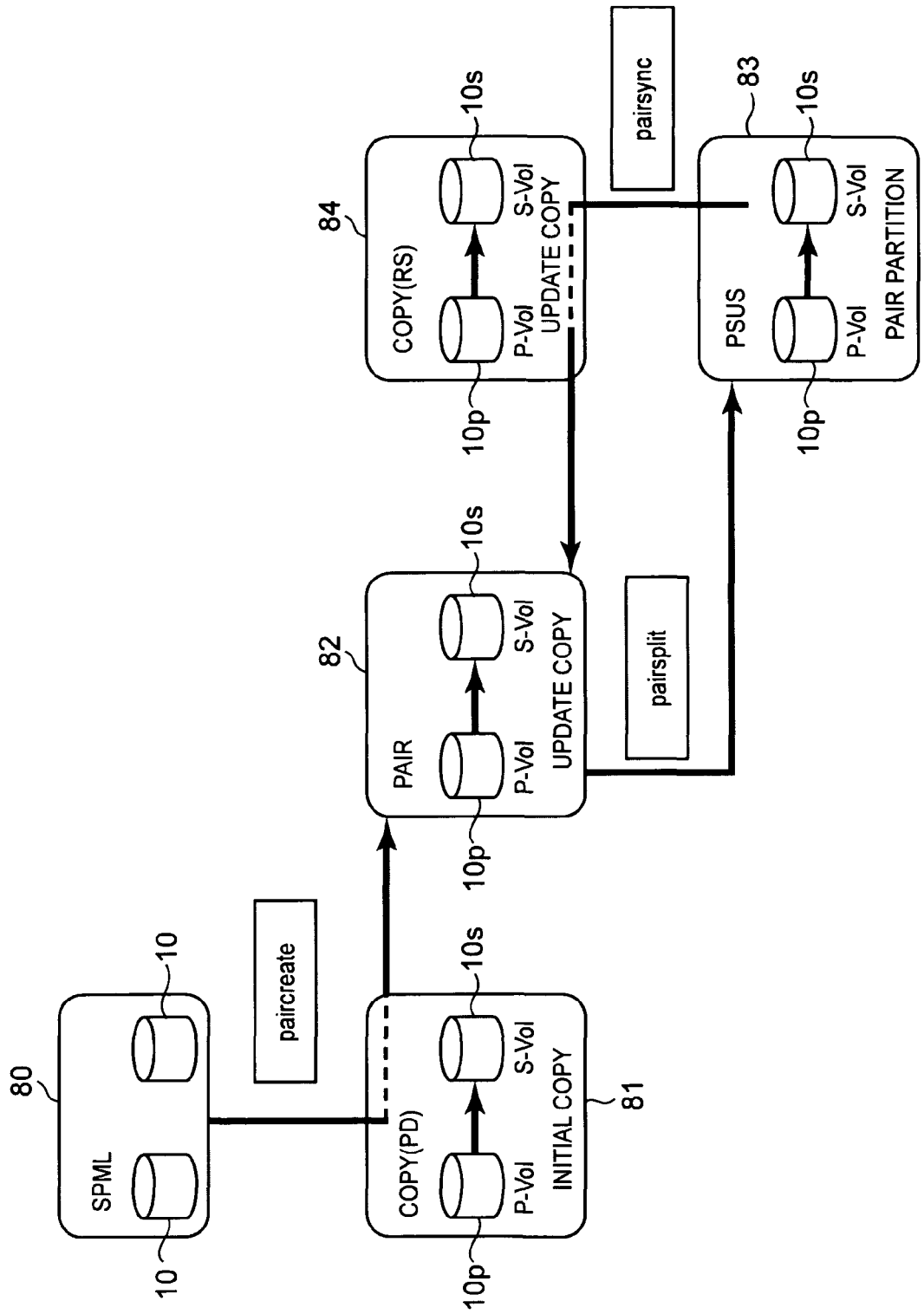
FIG. 6 illustrates state transitions in accordance with duplexing processing commands according to an embodiment of the present invention.

FIG. 6 illustrates state transitions in accordance with duplexing processing commands according to an embodiment of the present invention.

In the TMS device 4, in cases where the state of the plurality of logical volumes 10 is SPML (Simplex) state 80, when a pair create command comprising a designation that makes one logical volume of the logical volumes 10 the P-Vol (the first logical volume) and the other logical volume the S-Vol (the second logical volume) is transmitted from the task server 2, the CPU 53, which executes the control program 57, starts to execute an initial copy from the P-Vol 10p to the S-Vol 10s which are designated by the paircreate command. As a result, these logical volumes enter a COPY (PD) state 81. In cases where an initial copy is complete, the two designated logical volumes 10p and 10s assume a PAIR state 82. Prior to performing the task, a pairsplit command is transmitted from the task server 2. Upon receipt of the pairsplit command, the CPU 53 which executes the control program 57, partitions the P-Vol 10p and S-Vol 10s. As a result, the P-Vol 10p and S-Vol 10s assumes a PSUS state 83. The task server 2 performs normal tasks in this state 83. Consequently, the normal task access performance can be raised. In cases where an update is made by the task server 2 with respect to the P-Vol 10p in state 83, the CPU 53 updates the P-Vol 10p and manages information which indicates the update location in the P-Vol 10p.

In cases where two logical volumes 10p and 10s are in the PSUS state 83, when a backup is started with respect to a magnetic tape cartridge 74, a pairresync command is transmitted from the task server 2 and the CPU 53, which executes the control program 57, starts processing to mirror the update with respect to the P-Vol during PSUS state 83 in the S-Vol 10s. As a result, the P-Vol 10p and S-Vol 10s enter a COPY (RS) state 84. Further, when the update with respect to the P-Vol 10p is mirrored in the S-Vol 10s, the P-Vol 10p and S-Vol 10s assume PAIR state 82.

A pairsplit command is then transmitted by the task server 2. Upon receipt of the pairsplit command, the CPU 53 which executes the control program 57, partitions the P-Vol 10p and S-Vol 10s. As a result, the P-Vol 10p and S-Vol 10s enter PSUS state 83. In the PSUS state 83, a backup is made from the S-Vol 10s to the magnetic tape cartridge 74. The backup from the S-Vol 10s to the magnetic tape cartridge 74 will be described subsequently.

FIG. 7 illustrates the transition of states that correspond with commands of the backup and restore processing according to an embodiment of the present invention.

When settings for a group (TG: storage unit) comprising one or more magnetic tape cartridges 74 are made by the user using a management terminal (not shown), the TG enters a NORMAL state 90.

In this state, when a VDLbackup command is transmitted by the task server 2, the CPU 53, which executes the control program 57, makes the state of the TG designated by the VDLbackup command a COPY_WAIT state 91 and, after preparations have been made, starts to back up the data of the logical volume 10 designated as the save source in the VDLbackup command to the magnetic tape cartridge 74 of the TG designated as the save destination. In this embodiment, the S-Vol 10s of the PSUS state 83 is designated as the save-source logical volume. The save-destination TG accordingly enters the COPY state 92.

In cases where the data of the logical volume 10 designated as the save source is completely backed up to the magnetic tape cartridge 74 of the TG designated as the save destination by the CPU 53 which executes the control program 57, the state of the TG enters a COPY-END state 93. In cases where the backup fails in the COPY state 92 or where a VDLcopycancel command is received from the task server 2, the CPU 53 renders the state of the TG the COPY_FAIL state 94, whereupon, in cases where a VDLnormalize or VDLdiscard command is received from the task server 2, the state of the TG is then NORMAL state 90.

When a VDLrestore command is received from the task server 2 in a case where the TG state is the COPY_END state, the CPU 53 renders the TG state an RCPY_WAIT state and then starts a data restore from the magnetic tape cartridge 74 of the TG to the designated logical volume 10 in accordance with the designation of the VDLrestore command, and makes the TG state an RCPY state 96.

In cases where a data restore to the logical volume 10 by the CPU 53 that executes the control program 57 is successful, the TG state is rendered the COPY_END state 93. In cases where the restore fails in the RCPY state 96 or where a VDLcopycancel command is received from the task server 2, the CPU 53 renders the TG state an RCPY_FAIL state 97. Thereafter, in cases where a VDLnormalize command is received from the task server 2, the TG state is rendered the COPY_END state 93, whereas, in cases where a VDLdiscard command is received from the task server 2, the TG enters the NORMAL state 90. In cases where a VDLdisplay command is received from the task server 2, the CPU 53 retrieves the TG# of all the TG to which data with the LU# designated in the command have been saved from the TG management table 63 (See FIGS. 5 and 10) and transmits the retrieved results to the task server 2.

Returning now to FIG. 5, various tables 58 include LU management table 61 which constitutes an example of logical volume management table, tape cartridge management table 62, TG management table 63 which constitutes an example of storage unit management table, command control table 27, and data transfer control table 65.

FIG. 8 shows an example of an LU management table according to an embodiment of the present invention.

The LU management table 61 stores records each of which comprises an LU number field 61a, an LU closed state field 61b, a duplexing state field 61c, a P/S state field 61d, and a corresponding LU# (number) field 61e.

The LU number field 61a stores the LU number (LU#) that uniquely represents the logical volume 10. The LU closed state field 61b stores information which indicates whether the corresponding logical volume 10 is closed, normal, or undefined. The duplexing state field 61c stores information which indicates the duplexing state. In this embodiment, duplexing states include undefined, pair (PAIR), copy in progress (P→S), suspend (PSUS), and so forth. The P/S state field 61d stores information which indicates, in cases where the logical volume 10 which corresponds with the record is paired with another logical volume 10, whether the logical volume 10 which corresponds with the record is the P-Vol or the S-Vol. In cases where the corresponding logical volume 10 is the P-Vol, "P" is stored and, in cases where the corresponding logical volume 10 is the S-Vol, "S" is stored.

The corresponding LU# field 61e stores the LU# of the other corresponding logical volume 10, that is, the paired logical volume. That is, in cases where the logical volume 10 of the record is the P-Vol, the LU# of the S-Vol (second identification information) is stored and, in cases where the logical volume 10 of the record is S-Vol, the LU# of the P-Vol (first identification information) is stored.

For example, according to the second record, the LU# is "1" and normal, and a pair state is assumed, where the logical volume 10 is the P-Vol and same is paired with a logical volume 10 with the LU# "2".

FIG. 9 shows an example of a tape management table according to an embodiment of the present invention.

The tape cartridge management table 62 stores a record comprising a tape cartridge number field 62a, a tape cartridge status field 62b, a library number field 62c, a slot position field 62d, and a barcode field 62e.

The tape cartridge number field 62a stores the tape cartridge number (tape cartridge#) that uniquely represents the magnetic tape cartridge 74 in the TMS device 2. The tape cartridge status field 62b stores information which indicates whether the corresponding magnetic tape cartridge 74 is detached, normal, or undefined. The library number field 62c stores the number of the library in the tape library section 73 in which the corresponding magnetic tape cartridge 74 is stored. The slot position field 62d stores the number indicating the positions of the slot in the library of the tape library section 73. The barcode field 62e stores the information of the barcode of the corresponding magnetic tape cartridge 74. In this embodiment, the barcode of the magnetic tape cartridges 74 contain information that allows the magnetic tape cartridge 74 to be uniquely identified.

For example, according to the first record, the tape cartridge number is "0" and normal, the magnetic tape cartridge 74 is stored in slot position "0" of library number "0" and the information "000000L3" is contained in the barcode.

FIG. 10 shows an example of a tape group management table according to an embodiment of the present invention.

The tape group management table 63 stores a record comprising a TG (tape group) number field 63a, a TG closed state field 63b, a TG copy state field 63c, a mirror state field 63d, a tape cartridge number (primary) field 63e, a tape cartridge number (secondary) field 63f, a stored LU list field 63g, a write time field 63h, and a keyword field 63i.

The TG number field 63a stores the TG number (TG#: stored unit identification information) that uniquely represent tape group comprising at least one or more magnetic tape cartridges constituting storage unit that store data. The TG closed state field 63b stores information which indicates whether the corresponding TG is closed, normal, or undefined. The TG copy state field 63c stores information on the copy-related state of the TG. Copy-related state information includes the states shown in FIG. 7, that is, the NORMAL state 90, the COPY_WAIT state 91, the COPY state 92, the COPY_END state 93, the COPY_FAIL state 94, RCPY_WAIT state 95, the RCPY state 96, and the RCPY_FAIL state 97. The mirror state field 63d stores information which indicates whether the corresponding TG is in a mirror state, that is, whether data is duplexed and stored therein. The used tape cartridge number (primary) field 63e stores the tape cartridge numbers of the magnetic tape cartridges 74 belonging to the TG. In cases where the corresponding TG is in the mirror state, the tape cartridge number (primary) field 63e stores the tape cartridge numbers of the primary magnetic tape cartridges 74. The tape cartridge number (secondary field) 63f stores the tape cartridge numbers of the secondary magnetic tape cartridges 74 in cases where the TG is in the mirror state. The stored LU list field 63g stores a list of LU# of the logical volumes 10 which are backed up to the corresponding TG. The write time field 63h stores the time at which data is written to the TG. The keyword field 63i stores keyword which is associated with the corresponding TG. The keyword can be set arbitrarily by the user and may be a combination of the database type and the write date and time, for example. In addition, the keyword may differ for each TG and may be shared by TG which is utilized for the same task.

For example, according to the first record, it can be seen that the TG number is "0", the TG is normal, the copy state is "COPY_END", the mirror state is "ON", the primary used tape cartridge numbers are "0, 1" the secondary used tape cartridge numbers are "2, 3", the LU# of the stored data are "2, 4", the write date and time is "2007/07/20 01:23:45", and the keyword is "DB120070720".

FIG. 11 shows an example of a data transfer control table according to an embodiment of the present invention.

The data transfer control table 65 stores a record that comprises a data transfer direction field 65a, a TG# field 65b, a primary library # field 65c, a primary tape drive # field 65d, a primary tape cartridge # field 65e, a secondary library # field 65f, a secondary tape drive# field 65g, a secondary tape cartridge # field 65h, a transfer LU list field 65i, a transferred LU counter field 65j, a primary transfer destination LU list field 65k, and a secondary transfer destination LU list field 65l.

The data transfer direction field 65a stores information which indicates the direction in which data is transferred. For example, in cases where data is transferred from disk drives 8 to the magnetic tape cartridges 74, "D2T" is stored. In cases where data is transferred from the magnetic tape cartridges 74 to the disk drives 8, "T2D" is stored. The TG# field 65b stores the TG number of the data transfer source or data transfer destination. The primary library # field 65c stores the number of the library in which the data transfer source magnetic tape cartridge 74 is stored or the primary magnetic tape cartridge 74 constituting the data transfer destination. The primary tape drive # field 65d stores the number of the tape drive in which the data transfer source magnetic tape cartridge 74 is stored or the number of the tape drive in which the primary magnetic tape cartridge 74 constituting the data transfer destination is stored. The primary tape cartridge # field 65e stores the tape cartridge number of the data transfer source magnetic tape cartridge 74 or the tape cartridge number of the primary magnetic tape cartridge 74 constituting the data transfer destination.

The secondary library # field 65f stores the number of the library in which the secondary magnetic tape cartridge 74 constituting the data transfer destination is stored. The secondary tape drive # field 65g stores the number of the tape drive in which the secondary magnetic tape cartridge 74 constituting the data transfer destination is stored. The secondary tape cartridge # field 65h stores the tape cartridge number of the secondary magnetic tape cartridge 74 constituting the data transfer destination. Fields 65f, 65g, and 65h are utilized when performing a mirror backup to the magnetic tape cartridges 74.

The transfer LU list field 65i stores a list of LU# constituting transfer sources in the TG. The transferred LU counter field 65j stores a counter that indicates the LU being transferred. The primary transfer destination LU list field 65k stores a list of the LU# of the logical volumes 10 that actually perform writing. The secondary transfer destination LU list field 65l stores a list of the LU# of the logical volumes 10 that perform writing simultaneously.

The processing operation by the computer system 1 according to an embodiment of the present invention will be described next.

Figure 12:
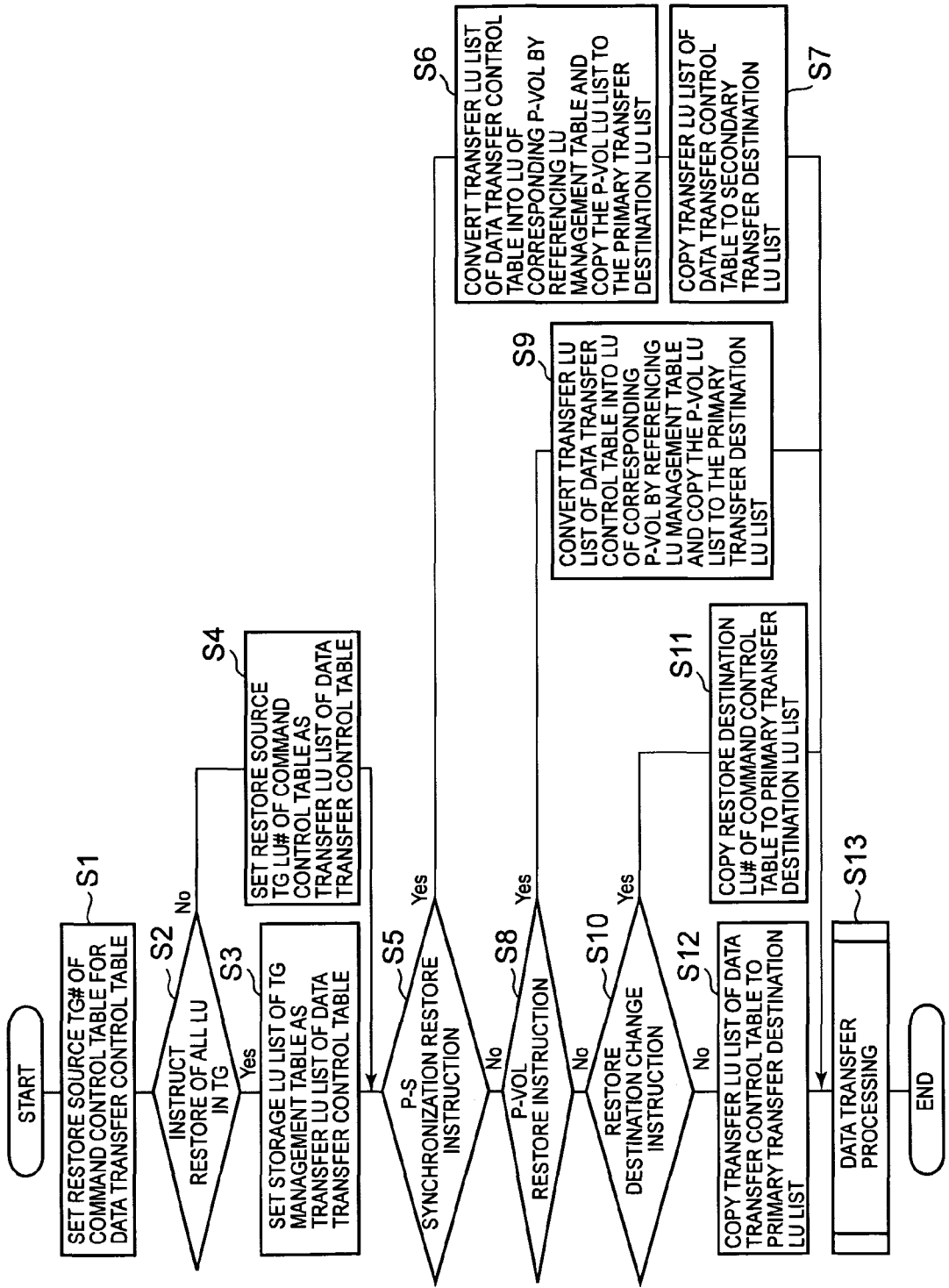
FIG. 12 is a flowchart for command processing according to an embodiment of the present invention.

FIG. 12 is a flowchart of the command processing by the TMS device 4 according to an embodiment of the present invention. The command processing is implemented as a result of the CPU 53 executing the command processing program 57a. Further, prior to the execution of this processing, data are saved and stored from the S-Vol 10s to the magnetic tape cartridge 74 of a specified TG in accordance with the settings by the user in the TMS device 4. In addition, in the task server 2, a restore command for performing data restoration (a data restore) by using the data of the magnetic tape cartridges 74 of the TG is designated by the user, the record of the command control table 27 which corresponds with the restore command is transmitted from the task server 2, and the record is stored in the command control table 27 of the memory 56 of the TMS device 4.

The CPU 53 sets the TG# of the restore source TG# field 26b of the command control table 27 in the memory 56 for the TG# field 65b of a new record of the data transfer control table 65 (step S1). Thereupon, the CPU 53 stores "T2D", which indicates a data transfer from the magnetic tape cartridge 74 to the disk drive 8 in the data transfer direction field 65a. Thereafter, the CPU 53 judges whether there is an instruction to restore the data of all of the LU in the TG based on the number of LU set in the restore target LU number field 27d of the command control table 27 (step S2). In cases where such a number has not been set, this means that the instruction is to restore the data of all the LU (step S2: Yes), and the LU list of the stored LU list field 63g of the record corresponding with the TG# in the TG management table 63 is set for the transfer LU list field 65i of the data transfer table 65 (step S3). As a result, the list of all the LU stored in the TG is set.

However, in cases where a number has been set for the restore target LU number field 27d of the command control table 27, this means that the instruction is to restore the data of predetermined LU in the TG (step S2: No). The LU# are acquired from the restore source TG LU# field 27e of the command control table 27 and these LU# are set for the transfer LU list 65i of the data transfer control table 65 (step S4). Thereupon, in cases where a number of two or more is set for the restore target LU number field 27d, the LU# are set for the corresponding number of restore source TG LU# fields 27e and, therefore, these LU# are set for the transfer LU list 65i of the data transfer control table 65 as a prepared list.

Following step S3 or step S4, the CPU 53 judges whether the restore option 26c of the command control table 27 contains an instruction to simultaneously restore the P-Vol and S-Vol (step S5). In cases where an instruction to simultaneously restore the P-Vol and S-Vol is contained therein (step S5: Yes), the respective LU# of the LU list stored in the transfer LU list field 65i of the data transfer control table 65 is converted to the LU# of the corresponding P-Vol by referencing the corresponding LU# field 61e of the LU management table 61 and the list of the LU# of the P-Vol is set for the primary transfer destination LU list field 65k of the data transfer control table 65 (step S6). As a result, the P-Vol can be properly set as the transfer destination even without the user directly designating the LU# of the P-Vol corresponding with the LU backed up to the TG (that is, the S-Vol). Following step S6, the CPU 53 sets the LU list stored in the transfer LU list field 65i of the data transfer control table 65 for the secondary transfer destination LU list field 65l of the data transfer control table 65 (step S7).

However, in cases where it is judged that an instruction to simultaneously restore the P-Vol and S-Vol is not contained in the restore option 26c of the command control table 27 (step S5: No), the CPU 53 judges whether an instruction to restore the P-Vol is contained in the restore option 26c of the command control table 27 (step S8).

As a result, in cases where an instruction to restore the P-Vol is contained in the restore option 26c (step S8: Yes), the CPU 53 converts the respective LU# in the LU list stored in the transfer LU list field 65i of the data transfer control table 65 into the LU# of the corresponding P-Vol by referencing the corresponding LU# field 61e of the LU management table 61 and sets the list of LU# of the P-Vol for the primary transfer destination LU list field 65k of the data transfer control table 65 (step S9) As a result, the P-Vol can be properly set as the transfer destination even without the user directly designating the LU# of the P-Vol corresponding with the LU backed up to the TG (that is, the S-Vol).

However, in cases where it is judged that an instruction to restore the P-Vol is not contained in the restore option 26c of the command control table 27 (step S8: No), the CPU 53 judges whether an instruction to change the restore destination is contained in the restore option 26c, that is, whether an LU# has been set for the restore destination LU# field 27f of the command control table 27 (step S10).

As a result, in cases where an instruction to change the restore destination is contained in the restore option 26c (step S10: Yes), the CPU 53 acquires the LU# from the restore destination LU# field 27f of the command control table 27 and sets the LU# for the primary transfer destination LU list 65k of the data transfer control table 65 (step S11). Thereupon, in cases where a number of two or more has been set for the restore target LU number field 27d, the LU# are set for the corresponding number of restore destination LU# fields 27f and, therefore, these LU# are set for the primary transfer destination LU list 65k of the data transfer control table 65 as a prepared list.

However, in cases where an instruction to change the restore destination is not contained in the restore option 26c (step S10: No), the CPU 53 sets the LU list stored in the transfer LU list field 65i of the data transfer control table 65 for the primary transfer destination LU list field 65k of the data transfer control table 65 (step S12).

Following the completion of steps S7, S9, S11, and S12, the CPU 53 executes data transfer processing (step S13).

FIG. 13 is a flowchart for data transfer processing according to an embodiment of the present invention.

The data transfer processing (step S13) is implemented as a result of the CPU 53 executing data transfer processing program 57b, cache control program 57c, disk control program 57d, library control program 57e, and tape drive control program 57f.

First, the CPU 53 specifies the magnetic tape cartridge number corresponding with the TG# stored in the TG# field 65*b* of the data transfer control table 65 by means of the TG management table 63 and conveys the magnetic tape cartridge 74 corresponding with the magnetic tape cartridge number from the tape library section 73 to the tape drive 71 by means of the conveyance mechanism section 72 (step S21).

Thereafter, the CPU 53 reads the data of the restore target LU one block at a time from the magnetic tape cartridge 74 by means of the tape drive 71 and stores the data in the cache memory 55 (step S22). The CPU 53 then writes the one block's worth of data stored in the cache memory 55 to the LU which corresponds with the LU# of the primary transfer destination LU list field 65*k* of the data transfer control table 65 (step S23).

The CPU 53 subsequently judges whether LU# have been set for the secondary transfer destination LU list field 65*l* of the data transfer control table 65 (step S24). In cases where LU# have been set (step S24: Yes), the CPU 53 writes one block's worth of data stored in the cache memory 55 to the LU corresponding with the set LU# (step S25). Therefore, the same data can also be rapidly written to the LU set for the secondary transfer destination LU list field 65*l*. As a result, data can be written to both the P-Vol and the S-Vol. However, in cases where the LU# have not been set for the secondary transfer destination LU list field 65*l* of the data transfer control table 65 (step S24: No), the processing advances to the next step.

Thereafter, the CPU 53 judges whether the copying of the LU of the restore target is complete (step S26) and, in cases where a copy is complete, the settings for the transferred LU counter field 65*j* of the data transfer control table 65 are updated to the LU# which is to be transferred next. Further, in cases where the copying is complete for all the LU (step S26: Yes), the settings are updated to information which indicates that the copying is complete (step S27). However, in cases where the copying of the LU is not complete (step S26: No), the processing advances to the next step.

Thereafter, the CPU 53 judges whether the end of the magnetic tape cartridge 74 has been reached (step S28) and, in cases where the end of the magnetic tape cartridge 74 has been reached (step S28: Yes), the magnetic tape cartridge 74 is exchanged for the next magnetic tape cartridge 74 in the same TG (step S29) whereas, in cases where the end of the magnetic tape cartridge 74 has not been reached (step S28: No), the processing advances to the next step.

The CPU 53 then judges whether the copying of all of the restore target LU is complete (step S29) and, in cases where the copying is not complete (step S29: No), the processing from step S22 is continued, whereas, when the copying of all of the LU is complete (step S29: Yes), the processing is terminated.

According to the above embodiment, the data can be easily and properly restored to the P-Vol without the user directly designating the LU# of the P-Vol simply by means of a designation in the restore command to restore the P-Vol or simultaneously restore the P-Vol and S-Vol.

Hence, the adverse effect of an erroneous designation of the LU# of the P-Vol by the user can be properly prevented. Further, in cases where the user is not aware of the relationship between the P-Vol and S-Vol or where this relationship cannot be tracked, a restore operation with respect to the P-Vol can be carried out without hindrance. In addition, a backup data designation can be easily and properly made without directly designating the TG# in which the backup data is recorded by utilizing the keyword that was designated when the backup was obtained, or the like.

Furthermore, in this embodiment, data which are read from the magnetic tape cartridge 74 are stored in the cache memory 55 so that a restore operation with respect to the P-Vol and S-Vol is performed. Hence, a P-Vol and S-Vol restore can be performed rapidly. As a result, for example, in comparison with a case where, following a restore operation to one logical volume 10 of the P-Vol or S-Vol, a copy is made to another logical volume 10 by using the data of the restored logical volume 10, the time until the duplexing is complete can be shortened to ¾ of the time, for example.

The present invention was described hereinabove based on embodiments but the present invention is not limited to the above embodiments and can also be applied to a variety of other forms.

For example, in this embodiment, in cases where a designation to perform a restore with respect to the logical volume comprising the P-Vol is made by a command, the restore with respect to the P-Vol is performed. However, the restore with respect to the P-Vol may also be made in cases where such a designation is not made by the command, for example.

Furthermore, the storage unit was one or more magnetic tape cartridges in the embodiment above but the present invention is not limited to such a storage unit. The storage unit may also be one magnetic tape cartridge, for example. In this case, magnetic tape cartridge identification information (the magnetic tape cartridge number) may also be used as the storage unit identification information.

In this embodiment, the TG# or keyword is shown as an example of data specification information but the present invention is not limited to the TG# or keyword. For example, in cases where the magnetic tape cartridge of the storage destination of the data of the restore target can be specified on the basis of the LU#, the LU# may also be data specification information and, even in cases where a plurality of TG that store data corresponding with the LU# exist, the settings may be such that any specified TG among the plurality of TG (the TG storing the latest data, for example) is the restoration target or the LU# may be used as data specification information. Further, although an example in which a restore is implemented by means of a command input is shown in this embodiment, a designation of the restore target tape cartridge may also be made by an application program that employs a GUI. In this case, designations to restore the S-Vol, restore the P-Vol and simultaneously restore the P-Vol and S-Vol may be selected by means of radio buttons, a drop button list, or a start button, or the like.

What is claimed is:

1. A storage apparatus having a plurality of storage devices and a magnetic tape drive capable of accessing a magnetic tape cartridge, the storage apparatus managing a plurality of logical volumes to which at least a portion of storage area of the plurality of storage devices are assigned, the logical volumes including a first logical volume for storing original data which are utilized by a host device and a second logical volume for storing the data of a copy of the original data of the first logical volume, and the storage apparatus saving the data of the second logical volume to the magnetic tape cartridge and restoring the saved data to the logical volume, comprising:

a logical volume management table for associating and storing first identification information which indicates the first logical volume and second identification information which indicates the second logical volume;

a data specification information acceptance section that accepts data specification information for specifying the data of a restoration target;

a specification section that specifies the second identification information of the second logical volume constituting a save source of the data specified by the data specification information;

a first identification information acquisition section that acquires the first identification information associated with the specified second identification information from the logical volume management table;

a reading control section that reads the saved data from the magnetic tape cartridge storing the data of the restoration target by means of the magnetic tape drive; and a first restoration control section that stores the data read from the magnetic tape cartridge to the first logical volume indicated by the acquired first identification information.

2. The storage apparatus according to claim 1, further comprising:

a second restoration control section that stores the data read from the magnetic tape cartridge in the second logical volume of the second identification information.

3. The storage apparatus according to claim 2, further comprising:

a cache memory for temporarily storing the data read from the magnetic tape cartridge, wherein the first restoration control section and the second restoration control section read data from the cache memory and stores the data in the first logical volume and the second logical volume.

4. The storage apparatus according to claim 1, further comprising:

a type designation acceptance section that accepts a designation of the type of the logical volume constituting the data restoration target, wherein, in cases where the type designation acceptance section accepts a designation that makes the first logical volume alone the restoration target or a designation that makes the first logical volume and the second logical volume the restoration target, the first restoration control section stores the data in the first logical volume.

5. The storage apparatus according to claim 1, wherein the data specification information acceptance section accepts, as the data specification information, storage unit identification information which indicates a storage unit comprising at least one or more of the magnetic tape cartridges which store the data, the storage apparatus further comprises:

a magnetic tape library section that identifiably stores a plurality of magnetic tape cartridges; and a conveyance mechanism section that removes a magnetic tape cartridge which corresponds with the storage unit identification information from the magnetic tape library section and conveys the magnetic tape cartridge to the magnetic tape drive, and wherein the reading control section reads data from the magnetic tape cartridge that has been conveyed to the magnetic tape drive.

6. The storage apparatus according to claim 5, further comprising:

a storage unit management table that associates and stores storage unit identification information which indicates a data storage unit comprising one or more magnetic tape cartridges and second identification information of a second logical volume constituting the save source of the data stored in the magnetic tape cartridges of the storage unit, wherein the specification section specifies second identification information by acquiring the second identification information that corresponds with the storage unit identification information from the storage unit management table.

7. The storage apparatus according to claim 1, further comprising:

a storage unit management table that associates and stores storage unit identification information which indicates a data storage unit comprising one or more magnetic tape cartridges and second identification information of a second logical volume constituting the save source of the data stored in the magnetic tape cartridges of the storage unit;

a search condition acceptance section that accepts a designation of second identification information of a second logical volume constituting the save source of the data as a condition for searching for storage unit identification information;

a search unit that searches for the storage unit identification information that is associated with the second identification information accepted by the search condition acceptance section from the storage unit management table; and a search result transmission section that transmits a search result of the storage unit identification information that has been searched for.

8. The storage apparatus according to claim 1, further comprising:

a storage unit management table that associates and stores a keyword that is associated with the storage unit and the second identification information of the second logical volume constituting the save source of the data stored in the magnetic tape cartridges of the storage unit, wherein the data specification information acceptance section accepts the keyword that is associated with the storage unit as the data specification information; and the specification section specifies second identification information by acquiring the second identification information that corresponds with the keyword from the storage unit management table.

9. A data restoration method performed by a storage apparatus that manages a plurality of logical volumes to which at least a portion of storage area of a plurality of storage devices are assigned, the logical volumes including a first logical volume for storing original data which are utilized by a host device and a second logical volume for storing the data of a copy of the original data of the first logical volume, the storage apparatus saving the data of the second logical volume to a magnetic tape cartridge and restoring the saved data to the logical volumes, comprising the steps of:

accepting data specification information for specifying data of a restoration target;

specifying the second identification information of the second logical volume constituting a save source of the data specified by the data specification information;

acquiring, from a logical volume management table that associates and stores first identification information which indicates the first logical volume and second identification information which indicates the second logical volume, the first identification information that is associated with the specified second identification information;

reading the saved data from the magnetic tape cartridges storing the data of the restoration target by means of a magnetic tape drive; and storing the data read from the magnetic tape cartridges to the first logical volume indicated by the acquired first identification information.

10. A computer system, having a host device, and a storage apparatus that manages a plurality of logical volumes to which at least a portion of storage area of a plurality of storage devices are assigned, the logical volumes including a first logical volume for storing original data which are utilized by the host device and a second logical volume for storing the data of a copy of the original data of the first logical volume, the storage apparatus saving the data of the second logical volume to a magnetic tape cartridge and restoring the saved data to the logical volume, wherein the host devices comprises:

a first interface that is connected to the storage apparatus; and a first processor that is connected to the first interface, the first processor transmitting storage unit identification information that specifies a storage unit comprising a magnetic tape cartridge which comprises the data of the restoration target to the storage apparatus, wherein the storage apparatus comprises:

a second interface that is connected to the host device;

a second processor that is connected to the second interface;

a plurality of storage devices;

a memory;

a magnetic tape library section that stores a plurality of magnetic tape cartridges;

a magnetic tape drive that inputs and outputs data to and from the magnetic tape cartridges; and a conveyance mechanism section that conveys the magnetic tape cartridges from the magnetic tape library section to the magnetic tape drive, wherein the memory stores a logical volume management table that associates and stores first identification information which indicates the first logical volume and second identification information which indicates the second logical volume, and a storage unit management table that associates and stores storage unit identification information which indicates a storage unit of data comprising one or more of the magnetic tape cartridges and second identification information of the second logical volume constituting the save source of the data stored in the magnetic tape cartridges of the storage unit, and wherein the second processor accepts the storage unit identification information from the host device via the second interface, specifies, by means of the storage unit management table, the second identification information of the second logical volume constituting the save source of the data of the storage unit specified by the storage unit identification information, acquires the first identification information associated with the specified second identification information from the logical volume management table, conveys the magnetic tape cartridges of the storage unit from the magnetic tape library section to the magnet tape drive by means of the conveyance mechanism section, reads the data of the restoration target from the magnetic tape cartridges by means of the magnetic tape drive, and stores the data read from the magnetic tape cartridges to the first logical volume indicated by the acquired first identification information.

* * * * *